United States Patent [19]

Vincent et al.

[11] 3,968,060

[45] July 6, 1976

[54] ENCAPSULATED FLAME RETARDANT SYSTEM

[75] Inventors: David N. Vincent, Glenview; Ronald Golden, Mount Prospect, both of Ill.

[73] Assignee: Champion International Corporation, New York, N.Y.

[22] Filed: Aug. 22, 1973

[21] Appl. No.: 390,523

[52] U.S. Cl. ............................. 260/2.5 AJ; 252/2; 252/8.1; 252/182; 260/2.5 R; 260/2.5 FP; 260/29.6 B; 260/29.6 MP; 264/191; 264/271
[51] Int. Cl.$^2$ ..................... C08K 9/10; C08J 9/00; C08G 18/14
[58] Field of Search................. 260/2.5 AJ, 2.5 FP, 260/2.5 B, 2.5 BE, 2.5 R

[56] References Cited
UNITED STATES PATENTS

| | | | |
|---|---|---|---|
| 3,262,894 | 7/1966 | Green | 260/2.5 AJ |
| 3,549,564 | 12/1970 | Parker | 260/2.5 AJ |
| 3,615,972 | 10/1971 | Morehouse | 260/2.5 FP |
| 3,660,321 | 5/1972 | Praetzel | 260/2.5 AJ |
| 3,697,422 | 10/1972 | Mackie | 260/2.5 FP |

*Primary Examiner*—C. Warren Ivy
*Attorney, Agent, or Firm*—Roylance, Abrams, Berdo & Kaul

[57] ABSTRACT

Microcapsules having an average diameter below 5 microns and containing a flame retardant material are incorporated into polymeric materials, such as polyurethane foams without affecting the structural integrity of the cell walls of the foam. The capsules are chemically bonded to the foam, as well as physically incorporated therein by employing polyhydroxy polymer-containing capsule wall materials which react with the isocyanate used in the polyurethane. The minute capsules are incorporated into paint to give increased hiding power as well as flame resistance, and are co-extruded into filaments.

16 Claims, No Drawings

ENCAPSULATED FLAME RETARDANT SYSTEM

This invention relates to microencapsulated flame retardant systems. More particularly, this invention relates to extremely small, compatible, encapsulated flame retardant particles and polymeric systems including the same.

Various suggestions have been made in an attempt to improve the flame retardancy of materials by the use of flame retardant additives. Although many of the proposed additives are effective in decreasing the flammability of the particular substrate to which they are added, in many cases they also have a detrimental effect upon the properties of the substrate. For example, it has been suggested to incorporate a reactive flame retardant with the monomer to be polymerized prior to the formation of the polymerized product. Unfortunately, this approach is of limited utility since the fundamental structure of the polymer is likely to be affected by the use of the additive. For example, when the flame retardant additive is a liquid, there is the problem of migration of the liquid within the material, as well as the volatility and eventual loss of the additive from the polymerized substrate. Moreover, many of the flame retardant materials are highly toxic and are released during the fabrication of the polymeric material, while still others are efficient plasticizers and have a highly adverse effect upon the properties of the polymeric materials.

The use of microencapsulated flame retardants has been suggested as a means for overcoming many of the aforementioned problems. Thus, by encapsulating the flame retardant materials within a substantially impermeable film, migration and volatilization of the flame retardant material is reduced or prevented. Additionally, the potential toxicity of the material is substantially reduced by isolating the toxic materials in an impermeable membrane.

Unfortunately, various difficulties can be experienced when microencapsulated flame retardants are utilized. For example, the incorporation of microcapsules into polymeric foams, such as those formed of polyurethane may experience a weakening of the cell walls when the microcapsules are incorporated therein, since the introduction of microcapsules into the foam results in the presence of stress points at the positions where the microcapsules become incorporated into the foamed structure. Additionally, the walls of the microcapsules are often incompatible with the polymeric structure and adversely affect the properties of the resulting foamed article.

It has now been found that the foregoing difficulties can be overcome by the use of flame retardant microcapsules having substantially spherical solid, polymeric walls surrounding a substantially spherical liquid or solid core consisting essentially of a flame retardant material, when the microcapsules have an average diameter below 5 microns, preferably between about 1 and about 4 microns.

According to one aspect of the present invention, flame retardant microcapsules having an average particle diameter below about 5 microns are incorporated into a polyurethane foamed product, said microcapsules having walls which are formed from a polyhydroxy polymer and are thereby compatible with said polyurethane foam. In this manner, the microcapsules are incorporated into the foamable reactants and thereafter chemically react with the isocyanate groups of the polyurethane foam, thereby becoming chemically bound, as well as physically incorporated into the polyurethane foam structure.

According to a still further aspect of the present invention, the small particle diameter, flame retardant microcapsules of the present invention are employed in the production of polymeric fibers, said microcapsules being sufficiently small to avoid clogging the extrusion equipment for producing said fibers e.g. the spinneret. Additionally, the present microcapsules do not materially alter the physical properties of the resulting fibers while rendering them flame resistant.

Another aspect of the present invention involves the incorporation of the present small diameter flame retardant microcapsules in paints, such as latex base paints, said microcapsules providing opacity or hiding power to said paints as well as providing flame resistant properties thereto.

It has been suggested to incorporate microcapsules into various polymeric materials. For example, U.S. Pat. No. 3,660,321 to Praetzel et al. indicates that microcapsules containing flame retardant materials may be incorporated in polystyrene, polyurethane and polyepoxides. Similarly, U.S. Pat. No. 3,317,433 to Eichel describes heat-rupturable microcapsules containing gas-producing agents for use as fire extinguishers in plastic materials. However, the capsules of Eichel are indicated as having a wall thickness of 5 microns (column 5, line 20) while Praetzel et al. disclose the use of microcapsules having a diameter of 5 to 5000 microns, and the use of microcapsules having a diameter of 20 microns for flame proofing polystyrene and polyurethane (column 6, line 27). Accordingly, the prior art has not recognized the advantages which may be realized by employing the small diameter microcapsules of the present invention.

The introduction of comparatively large diameter microcapsules, such as those having an average diameter of 20 microns or greater can result in the weakening of the cell structure of the foam. The cell wall or rib structure of the urethane foam has a typical size of, for example, 10–25 microns. Accordingly, when comparatively large diameter microcapsules are introduced into the polyurethane foamable mixture, the resulting foam contains numerous stress points in the foam at the points where the microcapsules have been introduced into the cell walls. By employing microcapsules having an average particle diameter less than 5 microns, only a relatively small fraction of the total thickness of the cell wall or rib of the foamed structure contains the microcapsules Thus, the aforesaid stress points are obviated providing a finished article having antiflammability properties without a reduction or weakening of the physical properties of the foamed material. The small diameter microcapsules of the present invention do not disrupt the continuity of the rib or cell wall of the foamed particles. In the case of flexible foams, where the cell wall or rib is extremely narrow, there is a correspondingly larger air space provided in the foam. Thus, greater antiflammability properties are required in view of the greater air space. However, the introduction of large diameter microcapsules results in a tremendous weakening of the comparatively thin cell walls. Accordingly, by incorporating the extremely small diameter microcapsules of the present invention in the thin cells of the flexible foamed polyurethane, the antiflammability properties are provided without weakening the foamed structure.

Any suitable fire retardant may be employed in the microcapsules of the present invention whether in liquid or solid form. Thus, the liquid fire retardant material or solution of such fire retardant material may be any one or a mixture of several classes of fire retardant chemical compounds such as phosphate esters, halogenated phosphate esters, phosphonate esters, halogenated phosphonate esters, phosphites, halogenated paraffins, halogenated olefins, halogenated aromatics and other halogenated organic compounds generally recognized as having fire retardant properties.

Specific examples of such compounds include tris (2,3-dibromopropyl)phosphate, tris(2,3-dichloropropyl)phosphate, tris(2-chloroethyl)phosphate, bis(2-chloroethyl)-2-chloroethyl phosphonate, mixed halogenated alkyl acid phosphates, tricresyl phosphate, cresyldiphenyl phosphate, diethyl-N,N-bis(2-hydroxyethyl)aminomethyl phosphonate, triphenyl phosphite, alkylaryl phosphites, alkyl phosphites, or the like. Other halogenated, organic compounds include ethylene dibromide, tetrabromoethane, tetrabromobutane, carbon tetrabromide, hexachloroethane, hexabromocyclododecane, perchlorobicyclo [2.2.1] heptane and other chlorinated cage compounds. Halogenated olefins such as tetrachloroethylene, hexachlorobutadiene, trichloroethylene, halogenated aromatics such as tribromobenzene, tribromophenol, pentabromophenol, hexabromobenzene, brominated bisphenol A and other organic compounds generally recognized as having fire retardant properties may be suitably employed in the present invention. As will be hereinafter demonstrated, the flame retardant material may be incorporated into the microcapsule by forming it into emulsion droplets by the addition to an aqueous solution of a wall-forming emulsifying agent.

According to a preferred aspect of the present invention, the microcapsular walls of the microcapsules to be employed in polyurethane foams are formed from polyhydroxy polymers, such as methylcellulose, poly(vinyl alcohol), starch or the like. Polyurethanes are commonly made by a reaction between a polyisocyanate and hydroxyl group-containing polyethers and/or polyesters. Accordingly, by employing polyhydroxy bearing polymers in the formation of the microcapsular walls, there are hydroxyl groups available to chemically react with the polyisocyanates of the polyurethane foam forming mixture to result in a chemical bonding between the microcapsular walls and the polyurethane structure.

Any suitable process for forming microcapsules may be employed including that described in U.S. Pat. No. 3,418,656 to A. E. Vassiliades wherein film-forming encapsulating agents, such as poly(vinyl alcohol), gelatin, various proteins, ureaformaldehyde resins, natural synthetic gums, polystyrene, polyvinyl chloride, and ethylcellulose are employed in the formation of the capsule wall. In the case of microcapsules for use in a polyurethane foam matrix, it is particularly preferred to use an hydroxyl-containing polymeric wall material, as previously indicated. Acordingly, an especially preferred process for forming microcapsules involves admixing:

A. a water-immiscible oily material containing an oil-soluble, non-polymeric cross-linking agent selected from the group consisting of a polyfunctional isocyanate and an orthoester of a Group IV element, and a water-immiscible, oily flame retardant material; and B. an aqueous solution of an hydroxyl group-containing polymeric, emulsifying agent.

The materials are admixed to form an oil-in-water emulsion wherein the oily, flame retardant material is dispersed in the form of microscopic emulsion droplets in an aqueous, continuous phase, and the cross-linking agent reacts with the polymeric emulsifying agent to provide each of the flame retardant-containing emulsion droplets with a solid, cross-linked capsule wall. A curing step is employed wherein the cross-linking agent and the polymeric emulsifying agent are subjected to temperatures in the range of ambient temperature to 100°C. for periods of time between 1 and 24 hours, preferably reaction is in the range of 40° to 80°C. for a period of 1 to 3 hours. The ratio of the emulsifying agent to cross-linking agent is at least one part by weight of emulsifying agent per part of cross-linking agent, preferably between about 4 and about 20 parts by weight of emulsifying agent per part of cross-linking agent.

Suitable oil-soluble polyfunctional isocyanates include 4,4'-diphenylmethane diisocyanate, toluene diisocyanate, hexamethylene diisocyanate, triphenylmethane triisocyanate, mixtures of such isocyanates, polyphenylene polyisocyanate (PAPI), and adducts of such isocyanates with polyhydric alcohols, such as trimethylopropane.

The orthoesters of Group IV metal elements which may be employed as cross-linking agents include the aliphatic and aromatic orthoesters of Group IVa and IVb elements, preferably the lower alkyl and aryl orthoesters of Group IV elements, such as tetraethyl orthosilicate, tetrapropyl orthosilicate, tetraphenyl orthosilicate, tetraethyl titanate, tetrapropyl titanate, tetrabutyl titanate, tetraphenyl titanate, tetraethyl germanate, tetrapropyl orthocarbonate, and the like.

Suitable polyhydroxy polymers include poly(vinyl alcohol), methylcellulose, starch, hydroxyethylcellulose and the like. An especially preferred polyhydroxy polymer is poly(vinyl alcohol). The poly(vinyl alcohol) is preferably a partially hydrolyzed or fully hydrolyzed poly(vinyl alcohol), which is a medium or high molecular weight form thereof. Thus, a medium or high molecular poly(vinyl alcohol) which has been hydrolyzed to an extent of 87 to 100 percent by weight is preferred, although poly(vinyl alcohol) having a lower degree of hydrolysis and/or molecular weight can be used if desired.

Subsequent to the formation of the microcapsules, the capsules can be incorporated directly from an aqueous slurry into the polyurethane form precursor mix, the paint formulation or the melt or solution to be spun. Alternatively, the capsule slurry can be treated by filtration, centrifugation, spray-drying or any other means of drying in order to form a dry powder consisting of microcapsules having a flame retardant core surrounded by an impermeable membrane. The microcapsules can then be dispersed in either an aqueous or a non-aqueous system in order to impart flame retardance thereto without any adverse effects upon the properties of the substrate.

Any suitable polyol commonly used in the formation of polyurethane foams may be used. For example, polyethers, such as polypropylene glycol, polyethylene glycol, polyethylene glycol/propylene glycol block copolymers, alone, or in admixture with branching agents, such as trimethylopropane, pentaeryithratol, and the like; hydroxyl-terminated polyesters, such as ethylene glycol-adipic acid, diethylene glycol-glycerol-adipic acid prepared with an excess of the alcohol so as to give hydroxyl terminated polymers.

Any of the conventional isocyanates can be used to prepare the polyurethane resins, such as toluene diisocyanate, or any of the other isocyanates mentioned previously in connection with the formation of the microcapsules.

In the case of urethane foams, the microcapsules may be admixed with the polyol component prior to admixing the isocyanate with the polyether and/or polyester. This results in the formation of a foamed polyurethane having the microcapsules chemically bound into the polyurethane, as well as physically entrapped therein.

According to another aspect of the invention, the microcapsules of the present invention are incorporated into an aqueous solution of sodium cellulose xanthate prior to feeding the solution to the spinning machine in a conventional viscose manufacturing process. Thus, a solution may be fed to a bucket or bobbin type spinning machine and the solution is thereafter extruded under pressure through a spinneret into a spinning bath.

The spinnerets are small caps of a noble metal containing minute holes through which the solution is extruded. In view of the fact that the microcapsules of the present invention have an average particle diameter of below one micron, preferably between about 0.2 and 1.0 microns, the capsules will not clog the minute holes in the spinneret. Furthermore, the extremely small sized microcapsules become incorporated into the ultimate filament without affecting its structural integrity. Likewise, the flame retardant microcapsules of the present invention may be incorporated in the solutions utilized to form melt spun fibers, such as nylon. Accordingly, the flame retardant microcapsules may be added to a solution of hexamethylene diammonium adipate prior to polymerization thereof and the resultant molten syrupy polymer is thereafter passes to a melt chamber and on to a spinneret where the polymer is formed into nylon yarn. Again, the microcapsules are of a size, i.e., when average particle diameter of one micron or less, preferably between about 0.2 and 1.0 micron, that they do not affect the properties of the resultant nylon fibers other than to render them flame resistant. The formation of such synthetic fibers and the conditions employed therein are conventional are described, for example, in Chapter 34, titled "Synthetic Fibers" of *The Chemical Process Industries*, Shreve, R. N., published by McGraw-Hill Book Company, Inc., (1956) at pages 743–765, which is hereby incorporated by reference.

As previously indicated, another aspect of the present invention relates to the incorporation of the minute microcapsular flame retardants of the present invention into paint. Not only do the small-sized microcapsules of the present invention increase the fire resistance of painted surfaces, but they also increase the opacity or hiding power of the resultant coating without affecting the surface properties thereof. Accordingly, the use of the flame retardant particles of the present invention permits the use of smaller amounts of opacifying pigment, such as titanium dioxide, then is ordinarily necessary.

Thus, the paints of the present invention contain the usual ingredients, such as film-forming materials, e.g., latex emulsions such as styrene-butadiene copolymers, linseed oil, soybean oil, tung oil, etc.; thinners, such as the aliphatic hydrocarbons, e.g., mineral spirits, naphtha and various petroleum fractions, turpentine; aromatic hydrocarbons, such as toluol, xylol and the like; driers, such as the naphthanates of cobalt, manganese, lead and zinc, plasticizers, and the like. Additionally, the paints of the present invention may contain the usual pigments and extenders. But in the case of pigments employed for white hiding, such as white lead, titanium dioxide, zinc oxide, zinc sulfide, and basic lead sulfate, a smaller proportion of such pigments may be employed and be substituted by the small diameter microcapsules of the present invention.

The amount of microcapsules to be incorporated in a particular paint composition may be varied over a wide range. Depending upon the nature of the paint and the degree of flame retardancy desired. Thus, for example, between about 0.1 and about 1, preferably between about 0.3 and about 0.6 pounds of microcapsules per gallon of paint may be employed.

The invention will be more particularly illustrated by the following examples. The percentages are by weight unless otherwise specified.

The following examples demonstrate the production of the flame retardant microcapsules of the present invention.

EXAMPLE 1

Thirty-two grams of a 3:1 molar adduct of toluene diisocyanate and trimethylolpropane are dissolved in 64 grams of a low viscosity chlorinated aliphatic hydrocarbon (commercially available as Exchlor 4 from the Diamond Shamrock Chemical Co. and containing 45 percent chlorine) and then admixed thoroughly with 800 grams of tris(2,3-dibromopropyl)phosphate (commercially available as Fyrol HB-32 from Stauffer Chemical Co.). The resulting oily solution is emulsified in 3434 grams of a 7 percent by weight of a high molecular weight, 87 percent hydrolyzed, poly(vinyl alcohol) solution (commercially available as Elvanol 50-42 G from E. I. duPont de Nemours Co.) containing 240 grams on a dry basis, in a large Waring-type blender until the emulsion droplets have an average particle size of 3 microns. The emulsion is then cured for 2 hours at 60°C. to harden the capsule walls. The cooled product is diluted at a ratio of 1:3 with water and allowed to stand for 3 days.

The supernatant liquid is poured from the sediment, and the sediment is redispersed in 3 liters of fresh water and permitted to settle once it began. The sediment is then spray-dried at 52 percent by weight solids at a temperature of 65°–93°C. to give a dry, free-flowing powder containing 85 percent by weight volatile oils. The dry powder comprises microcapsules having an average particle diameter of 3 microns and containing the flame retardant bis(2,3-dibromopropyl)phosphate.

EXAMPLE 2

Sixteen grams of the microapsules as produced in Example 1 are combined with 300 grams of a latex flat paint. The mixture is stirred at high shear to provide a flame retardant, water-based paint. When applied to a substrate, the paint provides an opaque, flame-resistant coating.

EXAMPLE 3

Eighty-seven parts by weight of a white semigloss latex paint are admixed with 13 parts by weight of a dispersion of microcapsules produced in the manner described in Example 1, (the dispersion containing 79 percent solids). Prior to being incorporated into the paint, the microcapsules are freed of excess poly(vinyl alcohol) by repeated washing with water and centrifugation. A flame retardant paint is thereby provided.

EXAMPLE 4

The procedure of Example 3 is repeated with the exception that 82 parts by weight of a white semigloss paint are admixed with 13 parts by weight of the capsule dispersion of Example 3 and 5 parts by weight of antimony oxide in order to provide a flame retardant paint.

EXAMPLE 5

Forty-eight grams of an adduct of toluene diisocyanate and trimethylolpropane are dissolved in 64 grams of the low viscosity, chlorinated aliphatic hydrocarbon of Example 1, and the resulting solution is admixed with 800 grams of tris (2,3-dichloropropyl)phosphate. The resulting solution is emulsified in 2350 grams of an 8 percent by weight polyvinyl alcohol (commercially available as Elvanol 52-42 G) employing a homomixer in order to obtain microcapsules having an average particle diameter less than 2 microns. The resulting emulsion is diluted with 300 grams of water and cured for 2 hours at a temperature of 60°–65°C. The product is then diluted on a 1:1 basis with water, and the capsule solids are separated by centrifugation. The sediment is diluted to 1 gallon and spray-dried at 11.6 percent solids while at a temperature of 65°–135°C. to give a dry, free-flowing powder.

EXAMPLE 6

Microcapsules having an average particle diameter below one micron are provided by dissolving 4 grams of the adduct of toluene diisocyanate and trimethylolpropane employed in the previous examples in 45 grams of a chlorinated aliphatic hydrocarbon. The resulting solution is emulsified in 150 milliliters of a 7 percent by weight, high molecular weight, 87 percent hydrolyzed polyvinyl alcohol solution containing 0.25 grams of the surfactant, sodium lauryl sulfate (30 percent by weight).

The resulting emulsion has a uniform particle diameter of one micron and less. The emulsion is cured for 3 hours at 60°–70°C.

EXAMPLE 7

This example demonstrates the incorporation of microcapsules into regenerated cellulose fibers.

Ten grams of filter paper are treated with caustic, then with carbon disulfide, and finally dissolved in dilute caustic in order to form an aqueous solution of sodium cellulose xanthate. After suitable aging or ripening of the viscose solution, 1.5 grams of microcapsules made in the manner of Example 6, but containing tris(2,3-dibromopropyl) phosphate and spray-dried, are dispersed in the sodium cellulose xanthate solution. The resulting mixture is filtered and then passed through a spinneret and extruded into a spinning solution containing 8–10 percent sulfuric acid, about 15 percent sodium sulfate, one percent zinc sulfate and about 6 percent glucose. The resulting solution from the spinneret is coagulated in the bath as a filament of regenerative cellulose containing the flame retardant microcapsules. The rayon fibers are then collected and upon testing have greatly reduced flammability, while their other physical characteristics remain similar to untreated rayon.

EXAMPLE 8

The following example demonstrates production of a urethane foam containing the microcapsules of the present invention.

Rigid, Freon-blown urethane foam is prepared by admixing 11.7 grams of a polyol resin component, i.e., a polypropylene glycol, and 18.3 grams of polyisocyanate. This results in a rapid initiation of an exothermic reaction and production of a rigid foam.

A second batch is prepared with the same proportions, but additionally, 3 grams of the spray-dried capsules of Example 7 containing 85 percent active flame retardant are thoroughly dispersed in the resin component before admixing the resin and the isocyanate.

The resulting foam shows no impairment of physical properties due to the presence of the microcapsules. On the other hand, the untreated foam burns vigorously when ignited, while the foam containing the flame retardant microcapsules is self-extinguishing.

EXAMPLE 9

In a manner similar to Example 8, a rigid, carbon dioxide blown urethane foam is prepared by reacting 10.6 grams of a polyester base resin with 9.4 grams of a polyisocyanate in order to provide an exothermic reaction with rapid formation of a rigid foam. The procedure is repeated with the exception that one gram of spray-dried microcapsules of Example 5 are thoroughly dispersed in the resin component before combining the resin and the isocyanate. The resulting foam is self-extinguishing, while the microcapsule-less foam burns vigorously.

EXAMPLE 10

Three grams of an adduct of toluene diisocyanate and trimethylolpropane are dissolved in 50 grams of tricresyl phosphate. The resulting solution is emulsified in 156 grams of an 8 percent high molecular weight, 87 percent hydrolyzed poly(vinyl alcohol) under conditions of agitation to provide microcapsules having an average diameter of 5 microns or below. The emulsion is diluted with 78 grams of water and cured for 2 hours at 60°–65°C. in order to yield flame retardant microcapsules.

EXAMPLE 11

Twenty-five grams of 1,1,2-tetrabromoethane are admixed with 25 grams of a chlorinated aliphatic hydrocarbon. Three grams of an adduct of toluene diisocyanate and trimethylolpropane are added to the solution and stirred for 5 minutes. The resultant clear solution is emulsified in 156 grams of an 8 percent poly(vinyl alcohol) from the previous Example. The emulsion is agitated under conditions to provide an average particle diameter of about 4 microns. Next, 78 grams of water are added and the emulsion is cured for 2 hours at a temperature of 60°–65°C. to provide microencapsulated flame retardants.

EXAMPLE 12

One gram of p,p'-diphenylmethane diisocyanate is dissolved in 10 grams of 1,2,4-trichlorobenzene and then mixed with 50 grams of tris(2,3-dibromopropyl)-phosphate in order to provide a clear solution. The solution is then added slowly to 235 grams of an 8.5 percent by weight solution of a high molecular weight, 87 percent hydrolyzed, poly(vinyl alcohol) in a Waring blender in order to provide an emulsion with particles having an average diameter of less than 5 microns.

The emulsion is cured by stirring and heating for a period of 2 hours at 60°C., after which it is cooled and treated with 5 grams of a 60 percent by weight solution of a water-soluble melamine-formaldehyde resin (commercially available as Virset 656-4 from the Virginia Chemical Co.).

EXAMPLE 13

Forth-three grams of a 7 percent by weight solution of methylcellulose (15 centipoise viscosity) are mixed with 10 milliliters of acetylene tetrabromide (29.6 grams solids) and emulsified in a Waring blender. Next, three 10-milliliter portions of water are added to reduce the viscosity. The final particle size of the emulsion droplets in about 4.5 microns. Next, 2 grams of a 63 percent by weight solid solution of a urea-formaldehyde resin (commercially available as RPC 916 from Monsanto Chemical Co.) are added, and the mixture is stirred to provide a flame retardant capsule slurry.

This invention has been described in considerable detail with particular reference to preferred embodiments, but it will be understood that variations and modifications can be effected within the spirit and scope of the invention as described in the appended claims.

We claim:

1. A self-extinguishing composition comprising a foamed plastic containing microcapsules in the cell walls thereof, said microcapsules having substantially spherical, solid, polymeric walls surrounding a substantially spherical core consisting essentially of a flame retardant material, said microcapsules having an average particle diameter of below about 5 microns.

2. The self-extinguishing article of claim 1 wherein said plastic foam is a polyurethane foam.

3. The self-extinguishing article of claim 2 wherein said microcapsules have walls comprising a polyhydroxy bearing polymer.

4. The self-extinguishing article of claim 3 wherein said polyhydroxy polymer is poly(vinyl alcohol).

5. The shaped article of claim 2 wherein said microcapsules have an average particle diameter of between about 2 and about 4 microns.

6. The self-extinguishing composition of claim 1 wherein said flame retardant material is tris (2,3-dibromopropyl) phosphate.

7. The self-extinguishing composition of claim 3 wherein said polyhydroxy polymer is methylcellulose or starch.

8. The self-extinguishing composition of claim 2 wherein said microcapsules have an average particle diameter of below about 2 microns.

9. A self-extinguishing composition comprising a foamed plastic, said foamed plastic having cell walls having a thickness in the range of 10 to 25 microns, said cell walls containing microcapsules having substantially spherical, solid, polymeric walls surrounding a substantially spherical core consisting essentially of a flame retardant material said microcapsules having an average particle diameter of below about 5 microns.

10. The composition of claim 9 wherein said foamed plastic is a polyurethane foam.

11. The composition of claim 10 wherein said microcapsules have polymeric walls comprising a polyhydroxy bearing polymer.

12. The composition of claim 9 wherein said microcapsules have an average particle diameter of between about 2 and about 4 microns.

13. The composition of claim 11 wherein said polyhydroxy bearing polymer is poly(vinyl alcohol).

14. The composition of claim 13 wherein said polymer is cross-linked by a polyfunctional isocyanate.

15. A self-extinguishing composition comprising a polyurethane foam, said foamed polyurethane having cell walls having a thickness in the range of 10 to 25 microns, said cell walls containing microcapsules having substantially spherical, solid, polymeric walls comprising a polyhydroxy bearing polymer, said microcapsules having an average particle diameter of between about 2 and about 4 microns, said microcapsules being chemically bonded to said polyurethane by virtue of a chemical reaction between the polyisocyanate forming said polyurethane and hydroxy groups available from said capsule walls.

16. The composition of claim 15 wherein said polyhydroxy bearing polymer is poly(vinyl alcohol).

* * * * *